Oct. 27, 1931.    J. H. VICTOR    1,829,248
GASKET
Filed Nov. 24, 1930
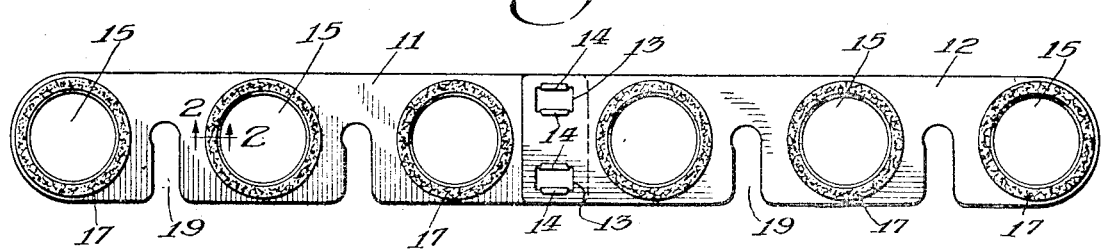
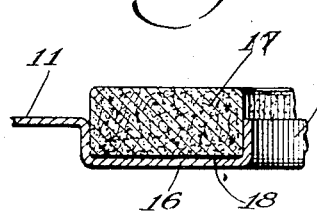 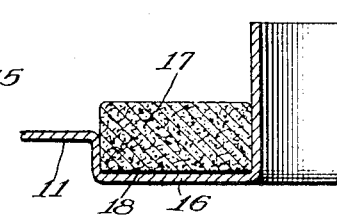 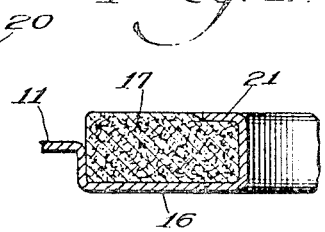
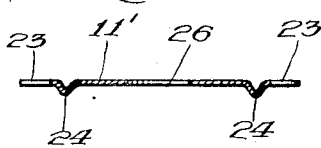 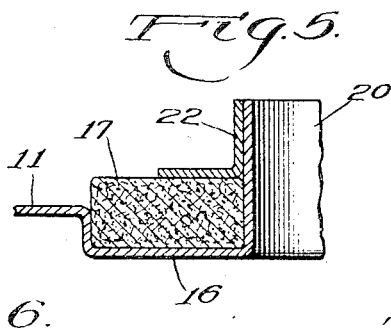 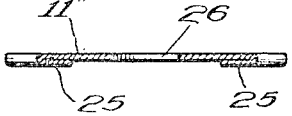
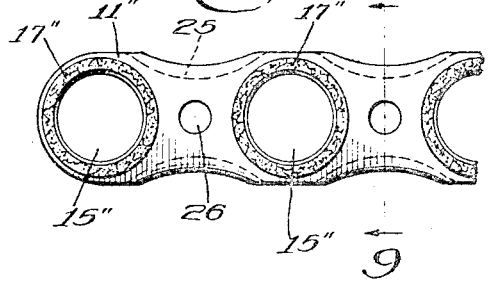
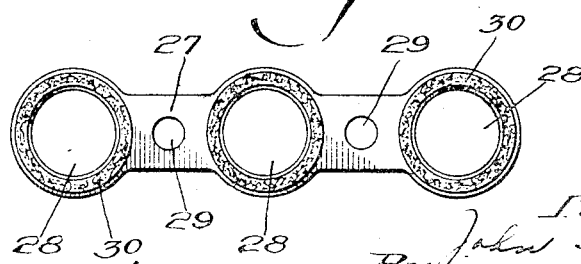
Inventor:
John H. Victor
By Wm. O. Bell, Atty.

Patented Oct. 27, 1931

1,829,248

UNITED STATES PATENT OFFICE

JOHN H. VICTOR, OF EVANSTON, ILLINOIS, ASSIGNOR TO VICTOR MANUFACTURING & GASKET COMPANY, OF CHICAGO, ILLINOIS, A CORPORATION OF ILLINOIS

GASKET

Application filed November 24, 1930. Serial No. 497,667.

This invention relates to certain novel improvements in gaskets and especially to gaskets which may be subjected to high temperatures.

The salient object of the invention is to provide a novel gasket which will afford an effective seal by reason of the neat fit thereof against the parts to be sealed thereby, resulting from the provision of a relatively flat face and the use of material embodying innate resistance to high temperatures.

Another object is to provide a novel gasket embodying a minimum number of parts having sufficient innate strength to effectively resist distortion and having a plurality of openings therein and wherein portions adjacent the openings may be effectively reenforced.

A further object is to provide a gasket having gasket material about the port openings thereof, effectively retained against undesired displacement.

Still further objects are to provide a gasket embodying portions movable relative to each other whereby the gasket may be retained in proper position and adjusted to care for variation and distortion of the members with which it is associated to insure proper fitting thereof; to provide a gasket susceptible to manufacture in different forms embodying common characteristics; and to provide a gasket which may be produced by a minimum number of operations in the manufacture thereof.

In the selected embodiments of the invention illustrated in the accompanying drawings Fig. 1 is an elevational view of one form of my invention;

Fig. 2 is a sectional view taken substantially on the line 2—2 on Fig. 1;

Figs. 3, 4, and 5 are views, similar to Fig. 2, showing modified forms of construction;

Fig. 6 is a fragmentary elevational view, similar to Fig. 1, showing a modified form of construction;

Fig. 7 is a sectional view taken substantially on the line 7—7 on Fig. 6;

Fig. 8 is a fragmentary view, similar to Fig. 7, showing a still further modified form of construction;

Fig. 9 is a sectional view taken substantially on the line 9—9 on Fig. 8; and

Fig. 10 is an elevational view depicting a further modified form of construction.

The invention, as illustrated in Figs. 1 and 2 of the accompanying drawings, includes a gasket body or holder formed from flat strips 11 and 12 which may be of steel or other material of sufficient innate yieldability to readily conform to any unevenness or irregularities in the members to be sealed thereby and of sufficient strength to withstand the stresses and strains impressed thereon. The material preferably has a coefficient of expansion substantially equal to that of the members with which it is to be used. The strips 11 and 12 are arranged in endwise alignment with adjacent end portions thereof overlapped medially of the holder. In the overlapped end of the strip 12 transversely aligned openings 13 are formed and in the adjacent end portion of the strip 12 are openings formed by providing lips 14 on the strip. The lips 14 are extended through the openings 13 and are bent over into engagement with the face of the strip 12 to thereby interconnect the strips 11 and 12 for slidable endwise movement relative to each other and also for slight movement transversely of each other. In each of the strips port openings 15 are formed, preferably equidistantly spaced apart and of a shape similar to the shape of the openings with which the gasket is to be associated. As best illustrated in Fig. 2, the body of the strip 11 is depressed about each of the openings 15 to provide annuli 16 offset at one face of the body and the portions of the strip providing the walls of the openings preferably extend at right angles to the main extent of the strip with the upper edges disposed in the plane of the body of the strip. In these annuli 16 rings 17 of gasket material are arranged, and these rings may be formed from asbestos or asbestos containing compounds or the like and, if desired, may be suitably reenforced. The rings 17 extend above the face of the strip into which the annuli 16 open and may be retained in the annuli by a suitable adhesive 18 or in any other desired manner. Under certain conditions of use the rings of gasket material may be covered with a suitable substance, such as graphite, in order to increase the heat resisting qualities thereof. The outer end portions of each of the strips 11 and 12 are preferably shaped to correspond with the contour of the outwardmost of the port openings. The just described gasket is particularly useful for sealing the manifold of an internal combustion engine, and the various port openings are respectively aligned with the inlet and exhaust ports of the engine block. The gasket is installed with the face thereof from which the rings 17 extend in engagement with the block, and it is manifest that a substantially smooth face is therefore presented which increases the sealing properties of the gasket. The manifold is arranged in engagement with the opposite face of the gasket and the bolts for securing the manifold to the block are passed through the slots 19 formed in the strips 11 and 12. Both the manifold and the block of an internal combustion engine become heated during use thereof and consequently expand. But by reason of the slidable connection between the sections 11 and 12 the gasket will be maintained in proper position on the block. Moreover, the slidable connection between the sections permits proper alignment of the gasket during original installation thereof, and the slots also facilitate this alignment.

In Fig. 3 a slightly modified form of construction is illustrated and herein the portion of the strip providing the wall of the port openings is extended through the openings to project above the body of the strip and the outwardly disposed face of the adjacent ring of gasket material to provide a neck 20. These necks 20 about the port openings 15 may be extended into the port openings in the block to insure proper alignment and also to protect the rings of gasket material which are secured in the annuli 16 by an adhesive 18 or the like in the same manner as that in which the ring 17 is retained in position in the embodiment of the invention illustrated in Fig. 2.

In Fig. 4 another modified form of construction is illustrated and herein the portions of the strip providing the walls of the various port openings 15 are extended through the port openings and the outer edges are bent or flared outwardly to provide flanges 21 which are forced into engagement with the outer faces of adjacent rings of gasket material disposed in the annuli 16 to hold said rings in position and to better protect these rings against the heat and gases which will pass thereby during operation of the engine. Since the flanges 21 effectively retain the rings 17 in position, no adhesive or other retaining means need be provided in this construction.

The embodiment of the invention illustrated in Fig. 5 is substantially similar to that shown in Fig. 3, but herein no adhesive is provided to retain the rings in position. In place of the adhesive a flanged collar 22 is provided and the neck portion of this collar is wedged into engagement with the neck portion 20 and the foot portion thereof is engaged with the outer face of the adjacent ring and thus the ring is effectively held in position and protected against deterioration and the collar also reenforces the neck.

In Figs. 6 and 7 a modified form of construction is illustrated and herein a strip 11', substantially similar to the strip 11, is provided, but the edges of the strip between the port openings 15' are recessed, as indicated at 23, and ribs 24 are formed inwardly of the recessed edges and these ribs project from the face of the strip opposite that from which the faces of the rings 17' extend. These ribs provide a reenforcement to better protect the strips against distortion. The rings 17' of gasket material may be retained on this strip in the manner illustrated in Figs. 2, 3, 4 or 5, as desired.

In Figs. 8 and 9 a further modified form of construction is illustrated and herein the strip 11'' has port openings 15'' therein, and the edges of the strip between the port openings are folded over the face of the gasket opposite that from which the free faces of the rings 17'' of gasket material extend, and these folded portions 25 serve to reenforce the strip 11'' in the same manner in which the ribs 24 reenforce the strip 11'.

In both Figs. 6 and 8 bolt holes 26 are provided intermediate the port holes in the strips, and these bolt holes are for the same purpose as the slots 19 and, if desired, slots similar to the slots 19 might be provided in place of the openings 26, either form being within the contemplation of my invention.

Heretofore I have described my invention as embodying slidably interconnected strips, each having three port holes therein. However, under certain conditions it may be desirable to provide separate strips rather than interconnected strips, and such a gasket is depicted in Fig. 10. Herein a strip 27 is provided having three port openings 28 therein with bolt openings 29 arranged intermediate the port openings 28. The outer ends of the strip are formed to correspond to the configuration of the end port openings and the portions of the strip intermediate the port openings are preferably of reduced width. If desired, the edges of these portions may have ribs such as 24 or folded portions such as 25 provided thereon for the purpose of reenforcing the gasket. Moreover, the rings 30 of gasket material in this gasket are arranged in cups similar to the annuli 16 and may be retained in these annuli in any of the manners shown in Figs. 2, 3, 4 or 5.

The improved gasket of this invention may be made with a minimum number of operations since the body portions thereof may be stamped from flat stock such as strip steel of suitable gauge and, if desired, multiple of dies may be provided for cutting the strips to shape and for drawing the ring receiving annuli therein in a single operation and at the same time these operations are performed the openings 13 and the lips 14 may be formed. Moreover, the rings 17 may be easily installed and properly located and, as has been previously described, these rings may be effectively retained in position to prevent undesired displacement thereof. Furthermore, the rings of gasket material afford sufficient resiliency to permit the gasket to be tightly clamped in position, and these rings are protected against deterioration by the inherent characteristics of the construction. Moreover, when a gasket having a plurality of port openings is provided it may be formed in sections which may be adjustable relative to each other to insure proper orientation thereof in operating position.

While I have illustrated certain selected forms of my invention it is to be understood that these are capable of variation and modification and I therefore do not wish to be limited to the precise details set forth but desire to avail myself of such changes and alterations as fall within the purview of the following claims:

I claim:

1. A gasket including a holder having port openings therein and provided with cupped annuli surrounding said openings and depressed beyond one face of said holder, said annuli including portions extended through said openings and providing walls therefor, and rings of gasket material in said annuli and extending beyond the other face of said holder for localizing the sealing action of the gasket about the ports.

2. A gasket including a holder having port openings therein and provided with annuli depressed beyond the plane of the holder and surrounding said openings, said annuli including portions extended through said openings and providing walls therefor, rings of gasket material thicker than the depth of said annuli and extending beyond the other face of said holder and seated in the annuli, and flanges on said walls for holding said rings of gasket material in said annuli.

3. A gasket including a holder having port openings therein and provided with cup shaped annuli depressed beyond the plane of the holder and surrounding said openings, said annuli including portions extended through said openings and providing walls therefor, rings of gasket material thicker than the depth of said annuli and extending beyond the other face of said holder and seated in the annuli, and means for retaining said rings in said annuli.

4. A gasket including a holder having port openings therein and provided with annuli surrounding said openings, said annuli including portions extended through said openings and providing walls therefor, and rings of gasket material thicker than the depth of said annuli and seated in the annuli, whereby sealing action of said gasket is localized about said ports.

5. A gasket including a holder having a port opening therein, an offset portion on one face of said holder providing an annulus in juxtaposition to said port opening, said holder including a portion extended through said opening and providing a wall therefor and extended beyond the other face of said holder, and a ring of gasket material in said annulus and including a portion extending beyond said other face of said holder but terminating inwardly of the outer end of said wall.

6. A gasket including a holder having a port opening therein, an offset portion on one face of said holder providing an annulus in juxtaposition to said port opening, said holder including a portion extending through said opening and providing a wall therefor and extended beyond the other face of said holder, a ring of gasket material in said annulus and including a portion extending beyond said other face of said holder and terminating inwardly of the other end of said wall, and a flanged collar engaging the ring of gasket material and the portion of said wall extending beyond said ring of gasket material.

JOHN H. VICTOR.